United States Patent
Jayawardena et al.

(10) Patent No.: US 7,925,766 B2
(45) Date of Patent: *Apr. 12, 2011

(54) METHOD FOR DISTRIBUTED DENIAL-OF-SERVICE ATTACK MITIGATION BY SELECTIVE BLACK-HOLING IN MPLS VPNS

(75) Inventors: Thusitha Jayawardena, Holmdel, NJ (US); Luis E. Morales, Freehold, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1439 days.

This patent is subject to a terminal disclaimer.

(21) Appl. No.: 10/782,512

(22) Filed: Feb. 18, 2004

(65) Prior Publication Data

US 2005/0180416 A1 Aug. 18, 2005

(51) Int. Cl.
G06F 15/16 (2006.01)
G06F 11/00 (2006.01)
H04J 3/10 (2006.01)

(52) U.S. Cl. ........ 709/229; 370/401; 709/230; 709/249; 726/22; 726/23; 726/24

(58) Field of Classification Search .................... 709/238
See application file for complete search history.

(56) References Cited

U.S. PATENT DOCUMENTS

| | | | |
|---|---|---|---|
| 6,618,761 B2 * | 9/2003 | Munger et al. | 709/241 |
| 7,062,782 B1 * | 6/2006 | Stone et al. | 726/22 |
| 7,149,219 B2 * | 12/2006 | Donahue | 370/392 |
| 2002/0037010 A1 * | 3/2002 | Yamauchi | 370/395.53 |
| 2002/0083175 A1 * | 6/2002 | Afek et al. | 709/225 |
| 2004/0148520 A1 * | 7/2004 | Talpade et al. | 713/201 |
| 2004/0172557 A1 * | 9/2004 | Nakae et al. | 713/201 |
| 2007/0061457 A1 * | 3/2007 | Li et al. | 709/225 |

FOREIGN PATENT DOCUMENTS

| | | |
|---|---|---|
| WO | WO-01/46807 | 6/2001 |
| WO | WO-02/25402 | 3/2002 |
| WO | WO-02/098100 | 12/2002 |
| WO | WO-2004/070535 | 8/2004 |

OTHER PUBLICATIONS

Iljitsch van Beijnum, BGP, Sep. 11, 2002, O'Reilly Media, 19-26.*
Official Letter for EP Patent Application No. 05101133.6, dated Oct. 12, 2007, consists of 3 pages.
Official Letter for EP Patent Application No. 05101133.6, dated Oct. 12, 2005, consists of 6 pages.
EP Search Report for EP Patent Application No. 05101133.6, dated Jun. 27, 2005, consists of 4 pages.
Examiner's Report for CA Patent Application No. 2,497,242, dated Feb. 11, 2008, consists of 4 pages.

* cited by examiner

*Primary Examiner* — Rupal D Dharia
*Assistant Examiner* — Joe Chacko

(57) ABSTRACT

A system and method for aiding the handling of DDoS attacks in which VPN traffic entering an ISP network at some points will be black-holed, while VPN traffic entering the ISP network at other points will be routed, as it should be, to the system-under-attack. Thus, the system-under-attack is made available to some of the user community and made unavailable to suspect portions of the user community. Furthermore, the number of entry points where black-holing of VPN traffic occurs can be selected and changed in real-time during a DDoS attack.

18 Claims, 2 Drawing Sheets

METHOD FOR DISTRIBUTED DENIAL-OF-SERVICE ATTACK MITIGATION BY SELECTIVE BLACK-HOLING IN MPLS VPNS

BACKGROUND OF THE INVENTION

1. Field of the Invention

The present invention relates generally to Virtual Private Networks (VPN) based on Multiprotocol Label Switching (MPLS), and more particularly to redirecting or rerouting VPN traffic in response to an attack caused by an attacker flooding a victim's host system with one or more of several types of attack traffic.

2. Background of the Invention

In a Distributed Denial of Service (DDoS) attack, an attacker takes control of one or more hosts (daemons) and uses the daemons to send an enormous amount of traffic to a, for example, web site so that no other traffic can get through to the website. In essence, the website is clogged or jammed with traffic. The frequency of DDoS attacks in the Internet has grown in the past several years. The flooding of a victim's host system with attack traffic causes legitimate users of the victim's host system to be denied access to applications running on the System-Under-Attack (SUA). The application can be a web server, a file server, a Domain Name System (DNS) server, or other Internet related service or device. The legitimate users cannot access the application due to Central Processing Unit (CPU) and/or bandwidth exhaustion on the system under attack. An attack may have a distributed nature due to the attack traffic being from random, usually spoofed, source IP addresses and originating from many daemon hosts. Also, the attack traffic may enter the victim's Virtual Private Network (VPN) network from various entry points.

It is well known that DDoS attacks are among the most difficult types of attacks to defend against. A system is vulnerable to a DDoS attack simply by being connected to the Internet. The federal government is increasingly aware of DDoS attacks and may propose that federal agencies only utilize ISPs that have DDoS protection in their networks.

For a DDoS attack to be successful in a Multiprotocol Label Switched (MPLS) Virtual Private Network (VPN) environment, the master, daemons and the system-under-attack (the victim) have to belong to the same or mutually accessible VPNs. In many other respects, a DDoS attack in a MPLS VPN is similar to a DDoS attack in an IP network.

BRIEF SUMMARY OF THE INVENTION

A more complete appreciation of the present invention and the scope thereof can be obtained from the accompanying drawings, which are briefly summarized below, the following detailed description of the presently-preferred embodiments of the invention, and the appended claims.

An embodiment in accordance with the present invention is an ISP network that includes a plurality of edge routers. A plurality of core routers is found within the ISP network and is adapted to allow communication between the plurality of edge routers. A VPN application, such as a website or database, is hooked up to be in communication with one of the edge routers. The VPN application has an IP address. There also exists a black-hole router that is in communication with either an edge router or one of the core routers. The black-hole router is adapted to black-hole at least some of the traffic having the IP address of the VPN application. The black-hole router can further selectively black-hole traffic addressed to the VPN application that is routed through one or more of the edge routers into the ISP network.

In the embodiment of the present invention, the black-hole router is adapted to inject a dummy or bogus IP address into the ISP network. The bogus IP address is the same address as the VPN application's address but has a higher preference value and a community value that selects a number of the edge routers and requires them to address VPN traffic, having the VPN application's IP address, to the bogus address thereby black-holing the traffic. Embodiments of the present invention are well suited for handling DDoS attacks on a website such that some of the traffic is diverted from getting to the website-under-attack and other VPN traffic is allowed to continue to the website-under-attack.

BRIEF DESCRIPTION OF THE DRAWINGS

The foregoing and other advantages of the invention will become more apparent upon reading the following Detailed Description of Embodiments of the Invention in conjunction and reference with the drawings.

Figure 1:
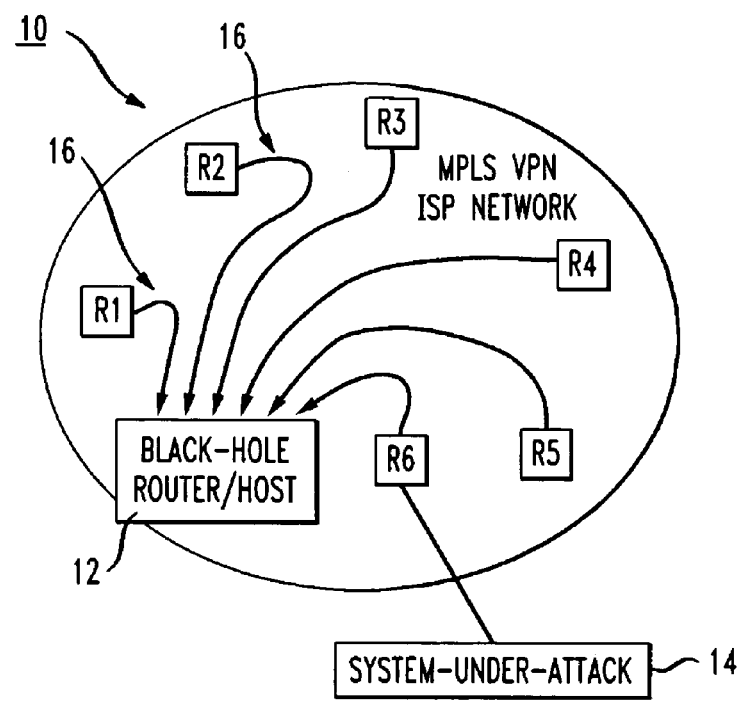
FIG. 1 depicts a general ISP network operating in part as a MPLS VPN using a known total black-holing technique.

While the invention is susceptible to various modifications and alternative forms, (for example, the invention can be easily adapted to a case with multiple black-hole routers.) specific embodiments have been shown by way of example in the drawings and will be described in detail herein. It should be understood, however, that the invention is not intended to be limited to the particular forms disclosed. Rather, the invention is to cover all reasonable modifications, equivalents, and alternatives falling within the spirit and scope of the invention as defined by the appended claims.

DETAILED DESCRIPTION OF THE INVENTION

The present invention will now be described more fully hereinafter with reference to the accompanying drawings in which preferred embodiments of the invention are shown. This invention may, however, be embodied in many different forms and should not be constructed as limited to the embodiments set forth herein; rather, these embodiments are provided so that this disclosure will be thorough and complete, and will fully convey the scope of the invention to those skilled in the art.

Referring to FIG. 1, currently the prevalent black-holing defense against a DDoS attack consists of redirecting all of the traffic destined to the system under attack to another router (or host) called a black-hole router (or host) 12. The redirected attack traffic is then analyzed to determine the origin of the attack or, the redirected traffic is simply dropped into a "black-hole" (hence the term black-holing). In either case, all of the traffic addressed for the system-under-attack 14 is redirected to the black-hole router 12. The system-under-attack 14 becomes unavailable to all users, legitimate or attacking, for the duration of the black-holing. Total (non-selective) black-holing is therefore not an effective defense against a DDoS attack since the attacker's intention of shutting down a VPN application or creating a denial-of-service to the system-under-attack is not averted.

FIG. 1 further depicts edge routers R1 through R6. Edge routers are routers on the edge of a VPN or the routers of an ISP that are in direct communication with customers. There is a plurality of other routers within or internal to the ISP network 10 that are not specifically shown called core routers. The routers internal to the ISP network that are part of the VPN are basically transparent routers that are used for backbone routing of traffic throughout the VPN. One of the fundamental differences between a MPLS VPN ISP and a regular ISP network is that each intermediate router of a regular ISP network has to determine the BGP next-hop router for every IP address known through BGP. Conversely, in a MPLS VPN ISP network the internal, intermediate routers are not concerned with BGP next-hop routers, but instead are preconfigured to pass traffic from any edge router R1-R6 to any other edge router R1-R6 through the use of MPLS.

Referring to FIG. 1, one of the exemplary techniques for mitigating an attack is for an MPLS VPN ISP network in accordance with the present invention to introduce a bogus route for traffic to take to the website. A black-hole router 12 is introduced to the MPLS VPN ISP network 10. The black-hole router 12 contains a bogus address to the website-under-attack 14. The bogus address and the website under attack each have the same address except the bogus address has a higher priority or preference. The higher preference requires that all traffic going to the website-under-attack's address will be diverted or black-holed to the black-hole router 12. The traffic flow arrows 16 indicate the direction of all traffic from the edge routers R1-R6 addressed to the website-under-attack 14 that is redirected to the black-hole router 12 via the bogus address having a higher priority than the website address. The bogus address is the same address as the address for the website-under-attack 14, except the bogus address has a higher priority or preference.

Since all the traffic intended for the website-under-attack is redirected to the black-hole router 12, then even the valid, non-attacking, traffic is black-holed. All traffic intended for the website-under-attack is diverted. The attacker has essentially won the attack and shut down the website-under-attack 14 while the MPLS VPN ISP and their customer(s) figure out what to do.

The MPLS VPN ISP analyzes the redirected traffic being received at the black-hole router 12 in order to trace where the attack traffic is coming from so that a better defense to the attack can be established. Meanwhile, legitimate users of the system are denied access to the website-under-attack 14 because legitimate traffic is also being black-holed.

There are a couple of popular types of attack traffic used by attackers. For example, SYN attack traffic is used as part of a message sent using Transmission Control Protocol (TCP). In TCP, a packet of information that initiates a TCP connection is called a SYN packet. An attacker sends many, many SYN packets to the website-under-attack. In turn, the website-under-attack, responds by attempting to create a TCP connection to all the incoming SYN packets. The proper response to a SYN packet by a website is to reply to each SYN packet with another SYN packet and then wait for another type of packet called an ACK packet to acknowledge receipt of the website's SYN packet and complete the "TCP Handshake" establishing a TCP connection between the website and the user.

In a SYN attack, the ACK is never sent back to the website-under-attack. Thus, the website-under-attack is bombarded with SYN packets. The website-under-attack replies to each SYN packet with appropriate SYN packets and waits for an ACK for each reply, but never gets any. The website-under-attack receives millions of SYN packets, but never receives an ACK. The website-under-attack is trying to set up all the potential TCP connections, but the TCP handshakes are never completed. The website-under-attack's bandwidth and processor is consumed by servicing the incomplete TCP handshakes and is in effect shut down to valid traffic.

In the other type of ICMP attack called a PING attack, the attacker utilizes the "PING" utility of the ICMP. The PING utility is used to determine whether a specific IP address is accessible. A PING packet is sent to a specified address and a reply is then sent by the specified address. In a PING attack, millions of PINGs are sent to the website-under-attack and the CPU becomes overwhelmed by attempting to respond to all the PINGs. In effect, the bandwidth of both the website's CPU(s) and communication channels is used up so that valid traffic to the website-under-attack is blocked.

Figure 3:
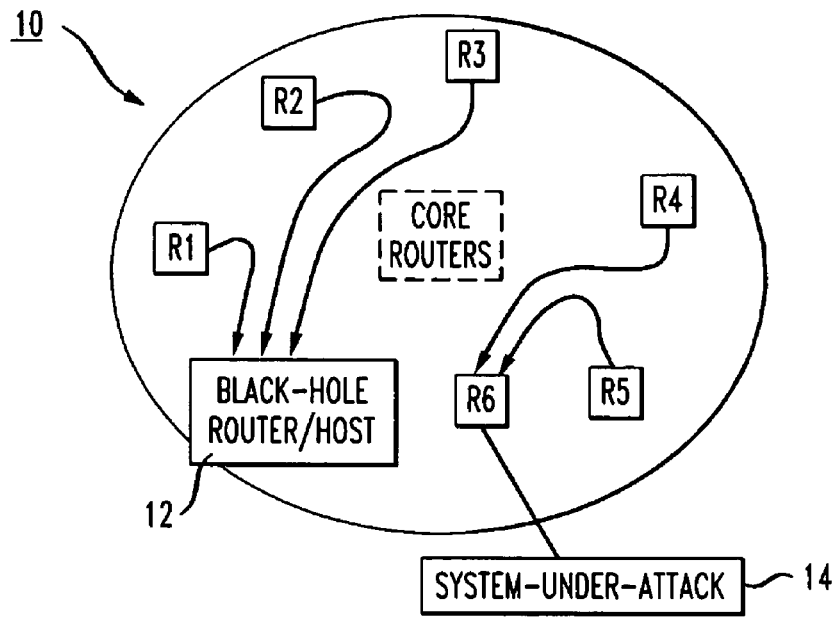
FIG. 3 depicts a general ISP network operating in part as a MPLS VPN using a selective black-holing technique in accordance with an embodiment of the present invention.

When all traffic to a website-under-attack is diverted by an MPLS VPN ISP to a black-hole router 12, it is referred to as non-selective black-holing. In accordance with an embodiment of the invention, a new technique that provides additional options for handling an attack on an application associated with an ISP is called selective-black-holing. As depicted in FIG. 3, selective-black-holing comprises selectively diverting traffic, destined to the system-under-attack 14, that enters a MPLS VPN ISP network 10 from a subset of entry nodes (R1, R2, R3) in the MPLS VPN ISP network and allowing traffic entering the MPLS VPN ISP network 10 from other entry points (R4, R5, R6) to reach the system-under-attack 14. This is achieved via dynamic routing protocols in combination with community-based route filtering.

The ISP must either determine or predetermine which edge routers should black-hole potential attack traffic and which edge router can allow the potential attack traffic to proceed to the address of the system-under-attack 14. There are different schemes that can be used to choose the entry nodes (routers) or edge routers that implement black-holing of potential attack traffic. One approach is to selectively black-hole traffic consecutively at each entry point (edge router) of the MPLS VPN ISP network. The black-holed traffic can be analyzed to determine the ratio of attack traffic to legitimate traffic at each entry point. Once traffic that is addressed to the system-under-attack from each selected or all entry points is analyzed, black-holing of the traffic can be limited to the entry points that have the highest percent of attack traffic.

Figure 2:
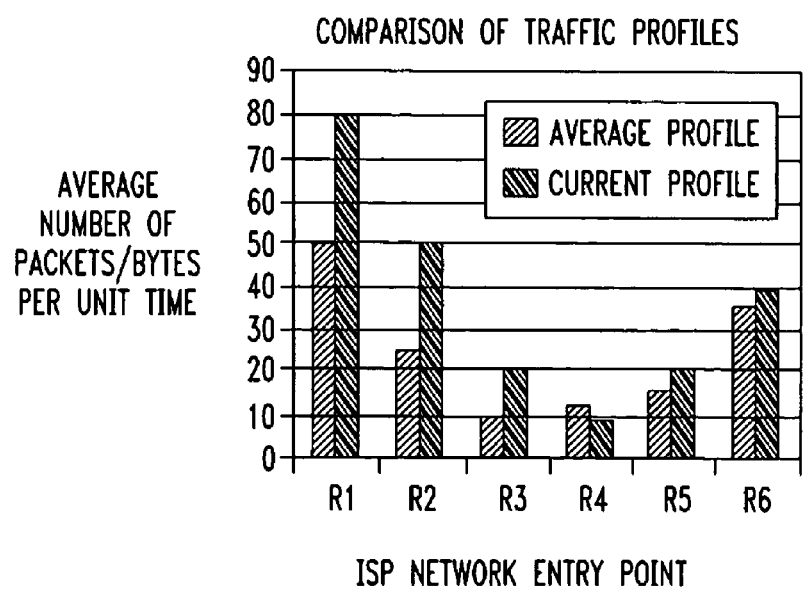
FIG. 2 is a graph comparing traffic profiles that may be utilized with an embodiment of the present invention.

Another technique, as shown in FIG. 2, for using selective-black-holing to analyze potential origins of a DDoS attack is to characterize the intensity of the attack at the major entry points of the DDoS attack traffic by comparing an "average" profile of traffic to a "current" profile of traffic (i.e., a profile from the past five or ten minute interval) at each of the entry points of the MPLS VPN ISP network. The average profile of traffic can be pre-constructed by the service provider for selected, or premium customers of the network. For example, the program utility called "NETFLOW", Cisco Corporation's traffic statistics collection feature, can be used to construct such profiles.

For example, in FIG. 2, router one R1 may be an edge router entry point in California. Router two R2 may be an edge router entry point in New York. Router three R3 may be an edge router in Boston. Routers R4-R6 may be edge routers in other major cities. By comparing an average traffic profile with the current traffic profile for each router one may surmise that attack traffic mainly originating from edge routers R1, R2 and R3 because the traffic addressed to the system-under-attack 14 increased significantly in the current traffic profile (i.e., during the attack) when compared to the average traffic profile.

By using selective-black-holing in accordance with an embodiment of the invention VPN traffic sent to the system under attack via routers one, two and three (R1, R2 and R3) can be, black-holed to the black-hole router 12 shown in FIG. 3. The traffic received at the black-hole router can be analyzed to determine whether attack traffic is present. And, if so, where the attack traffic is originating.

Meanwhile, routers four, five, and six (R4, R5, R6) can selectively be allowed to continue forwarding traffic, addressed to the system-under-attack, to the system-under-attack 14. Thus, the attacker has not succeeded in "shutting down" the system-under-attack 14 because traffic may still be received and transmitted from the system-under-attack 14. The communication bandwidth and/or the microprocessor(s) at the system-under-attack are not attempting to operate beyond their capabilities when majority of the attack traffic is being black-holed. There are various advantages to using selective-black-holing. For, the response time to a DDoS attack can be decreased since various selective-black-holing strategies can be predetermined and implemented as soon as a DDoS attack is discovered to be underway. By using Border Gateway Protocol (BGP) routing and community-based route filtering in exemplary embodiments of the invention, a predetermined black-holing strategy can be set-up and implemented. BGP is an exterior gateway routing protocol that enables groups of routers to share routing information. BGP is commonly used within and between ISPs. It is understood that an exemplary network or system can utilize other dynamic routing protocols, besides BGP, as long as they allow route filtering. Once an attack has commenced, the selective-black-holing is initiated by communicating the IP address of the system-under-attack with a predefined community value and higher preference from selected point(s) in the ISP network. Depending on the community value, traffic destined to the system-under-attack from any number of entry points (i.e., edge routers) can be rerouted to the black-hole router.

The black-holing strategy can also be adjusted in real-time during an attack. By adjusting the number of entry points (edge routers) that black-hole traffic that is addressed to the system-under-attack, the system-under-attack can be made available to part of the user-community during a DDoS attack.

An embodiment of the present selective-black-holing technique can selectively adjust the number of edge routers (from none to all the routers) that direct a specific type of traffic to a black-hole router in the MPLS VPN ISP network. For route filtering in a selective black-holing MPLS VPN ISP system-iBGP (MP-iBGP) route filtering is utilized using community values. As stated above, selective-black-holing can be implemented using other dynamic routing protocols and filtering schemes besides iBGP.

Still referring to FIG. 3, black-holing of attack traffic is achieved by injecting, by the ISP (via any router including the black-hole router 12), the IP address of the system-under-attack 14 into a routing protocol, such as a BGP. The injected IP address is the same IP address as the address of the system-under-attack except that the injected IP address has a higher preference than the IP address of the system-under-attack.

Figure 4:
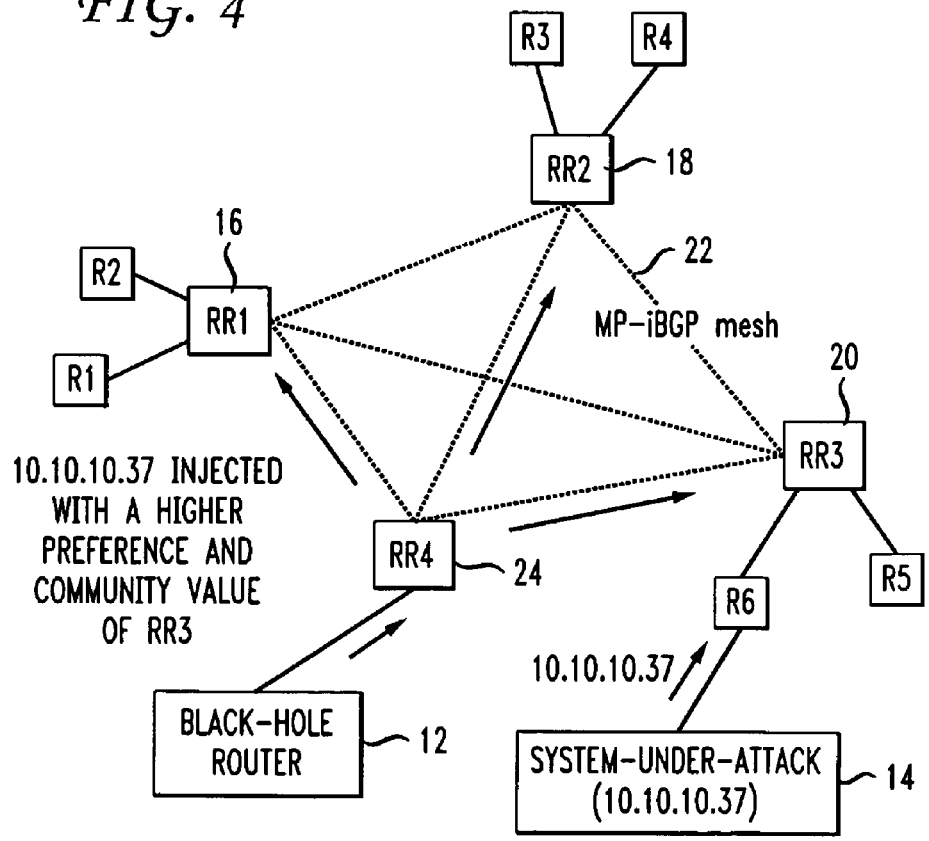
FIG. 4 depicts exemplary black-holing in a MPLS VPN using MP-iBGP route filtering.

In another embodiment of the present invention, route reflectors (RRs) can be implemented. Route reflectors are typically used in large ISPs. Referring to FIG. 4, the implementation of RRs in an embodiment of the invention comprises using a community attribute in the BGP to enable selective filtering of routing updates in MP-iBGP sessions. Every edge router R1-R6 must communicate with every other edge router in the ISP in order to disseminate information indicating, among other things, the destinations that the edge router can communicate with. In a large network disseminating the information to all the edge routers by each edge router is a daunting, bandwidth consuming task. There can be hundreds to thousands of edge routers in a given ISP network. A technique for simplifying the task of each edge router communicating with all other edge routers is to use route reflectors.

Instead of communicating with every edge router, each edge router informs its immediate route reflector of the possible route(s) it can reach. The route reflector then reflects the route information, via an MP-iBGP mesh 22, to other route reflectors, which in turn communicates to their associated edge routers the routing information.

In FIG. 4, all entry points (R1-R6) of an ISP Network 40 and the black-hole router 12 are Provider Edge (PE) routers in the VPN context. The PE routers are route reflector clients of the RRs 16, 18, 20, and 24. Selective route filtering is achieved by filtering based on community values in the MP-iBGP sessions. There is an MP-iBGP full mesh 22 among all RRs 16, 18, 20, 24. In this embodiment, the selectivity is limited to sets of RR clients, edge routers that are served by their own RR. That is, all of the attack and legitimate traffic entering a set of edge routers (e.g., R1 and R2) addressed and destined for the system-under-attack 14 has to be black-holed in the black-hole router 12 or allowed to reach the system-under-attack 14.

Embodiments of the present invention can be adjusted or implemented as a protection for premium customers because average traffic profiles for each edge router can be preconstructed for the premium customer's IP addresses. When such a customer's application 14 becomes the target of a DDoS attack, the black-hole router 12 can be preconfigured to handle an attack on application 14 by utilizing a set of community values and associated higher preferences for selective black-holing.

Embodiments of the invention provide a real-time adjustable and selectable black-holing strategy for handling a DDoS attack in a manner that does not shut down the system-under-attack. Embodiments of the present invention and obvious variations thereof are contemplated as falling within the spirit and scope of the claimed invention, which is set forth in the following claims:

What is claimed as new and desired to be protected by Letters Patent of the United States is:

1. An internet service provider virtual private network comprising:
   a plurality of edge routers;
   a plurality of core routers for allowing communication between the plurality of edge routers;
   a virtual private network application in communication with the plurality of edge routers, the virtual private network application having a first internet protocol address; and
   a black-hole router in communication with the plurality of core routers, wherein virtual private network traffic received by the black-hole router is black-holed, the black-hole router for injecting a second internet protocol address into the internet service provider virtual private network, the second internet protocol address comprising:
   a same internet protocol address as the first internet protocol address;
   a higher preference value than the first internet protocol address; and
   a community value such that when the second internet protocol address is injected, a selected first number of edge routers of the plurality of edge routers directs virtual private network traffic addressed for the first internet protocol address to the virtual private network application and a selected second number of edge routers of the plurality of edge routers directs virtual private network traffic addressed for the second internet protocol address to the black-hole router.

2. The internet service provider virtual private network of claim 1, wherein the internet service provider virtual private network is a multiprotocol label switching virtual private network.

3. The internet service provider virtual private network of claim 1, wherein the black-hole router injects the second internet protocol address in response to a distributed denial of service attack on the virtual private network application.

4. The internet service provider virtual private network of claim 1, wherein the community value is changed by the black-hole router.

5. The internet service provider virtual private network of claim 1, wherein the internet service provider virtual private network utilizes a plurality of dynamic routing protocols in combination with a community-based route filtering to propagate the injected second internet protocol address to the plurality of edge routers.

6. The internet service provider virtual private network of claim 1 wherein when the selected second number of edge routers directs virtual private network traffic, addressed for the first internet protocol address, to the black-hole router, the black-hole router is for receiving such virtual private network traffic as black-holed-traffic, the black-hole router for analyzing the black-holed traffic in order to determine a ratio of attack traffic to legitimate traffic.

7. The internet service provider virtual private network of claim 1, further comprising a route reflector, the route reflector being connected to a different set of edge routers from the plurality of edge routers, the route reflector for updating the plurality of edge routers with route instructions, such route instructions including the injected second internet protocol address.

8. An internet service provider network comprising:
a plurality of edge routers;
an application in communication with the plurality of edge routers;
the application having a first internet protocol address such that virtual private network traffic addressed for the first internet protocol address and entering the internet service provider network at any one of the plurality of edge routers, is routed to the application;
a black-hole router, wherein virtual private network traffic received by the black-hole router is black-holed; and
a router for injecting an instruction into the internet service provider network, such that a select edge router of the plurality of edge routers redirects virtual private network traffic, which is addressed to the first internet protocol address, to the black-hole router, wherein the instruction that is injected comprises a routing instruction having a same internet protocol address as the first internet protocol address, but with a higher preference value than the first internet protocol address and having a community value such that when the routing instruction is injected, a selected first number of edge routers of the plurality of edge routers directs virtual private network traffic addressed for the first internet protocol address to the application.

9. The internet service provider network of claim 8, wherein the internet service provider network is a multiprotocol label switching virtual private network.

10. The internet service provider network of claim 8, wherein the router and the black-hole router are the same device.

11. The internet service provider network of claim 8, wherein the routing instruction is a border gateway protocol routing instruction.

12. The internet service provider network of claim 8, wherein the black-hole router is for receiving redirected traffic from the select edge router and to determine a ratio of attack virtual private network traffic to legitimate virtual private network traffic found in the redirected traffic.

13. The internet service provider network of claim 8, wherein the router injects the routing instruction when the application is experiencing a distributed denial of service attack.

14. A method of managing a distributed denial of service attack on an application within an internet service provider network, the application having a first internet protocol address, the method comprising:
injecting a border gateway protocol routing instruction into the internet service provider network when the distributed denial of service attack is occurring, the border gateway protocol routing instruction comprising a second internet protocol address having a same internet protocol address as the first internet protocol address, but with a higher preference value than the first internet protocol address and having a community value;
redirecting, at a selected edge router, virtual private network traffic addressed for the second internet protocol address to a black-hole router, wherein the virtual private network traffic received by the black-hole router is black-holed; and
directing, at another edge router, virtual private network traffic addressed for the first internet protocol address to the application that is experiencing the distributed denial of service attack.

15. The method of claim 14, wherein the internet service provider network is a multiprotocol label switching virtual private network.

16. The method of claim 14, further comprising:
receiving, at the black-hole router, the redirected virtual private network traffic; and
determining an amount of attack traffic.

17. The method of claim 14, further comprising changing, a number of selected edge routers that is redirected.

18. The method of claim 14, wherein the injecting the border gateway protocol routing instruction into the internet service provider network is done by providing the border gateway protocol routing instruction to a route-reflector for disseminating the border gateway protocol routing instruction to other route reflectors within the internet service provider network.

* * * * *